July 12, 1927.
E. G. KESLING
1,635,483
SPEED CHANGING MECHANISM
Filed Sept. 14, 1926
2 Sheets-Sheet 1
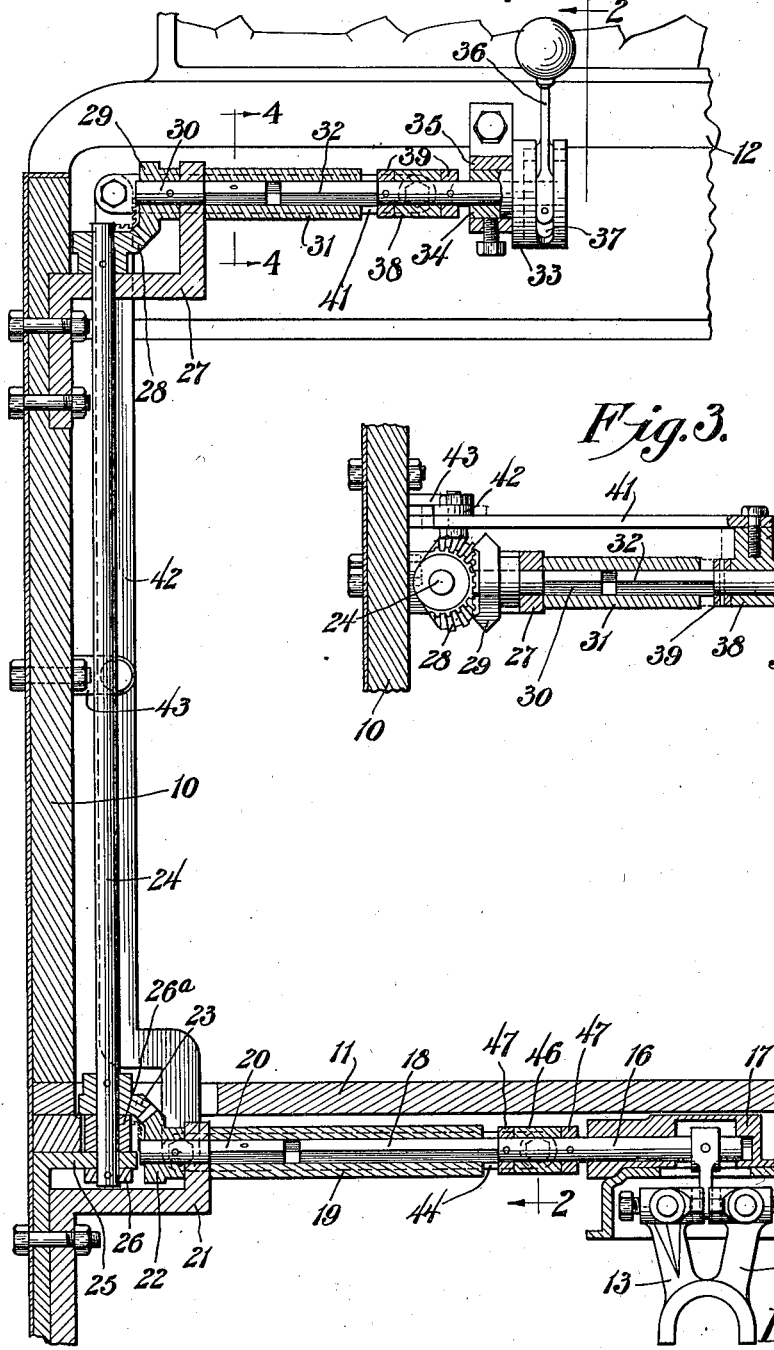

July 12, 1927.  1,635,483
E. G. KESLING
SPEED CHANGING MECHANISM
Filed Sept. 14, 1926  2 Sheets-Sheet 2
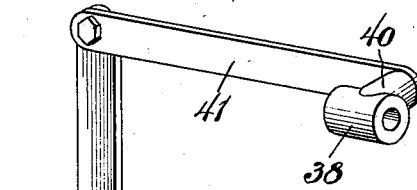
Fig.5.
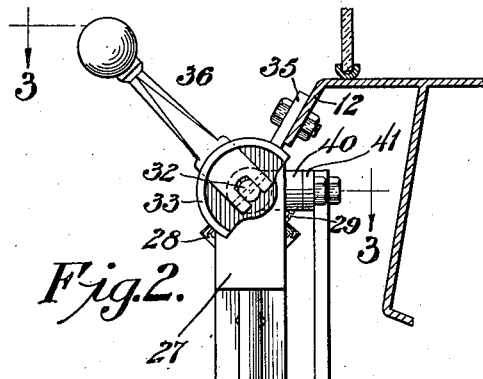
Fig.2.
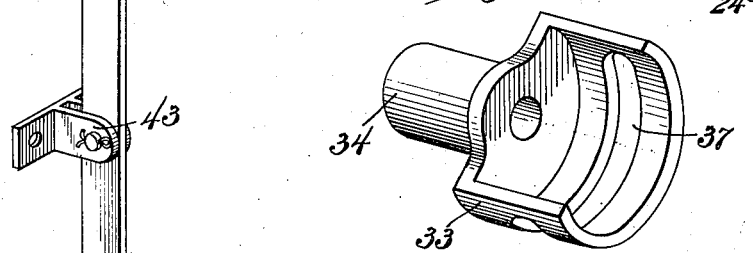
Fig.6.
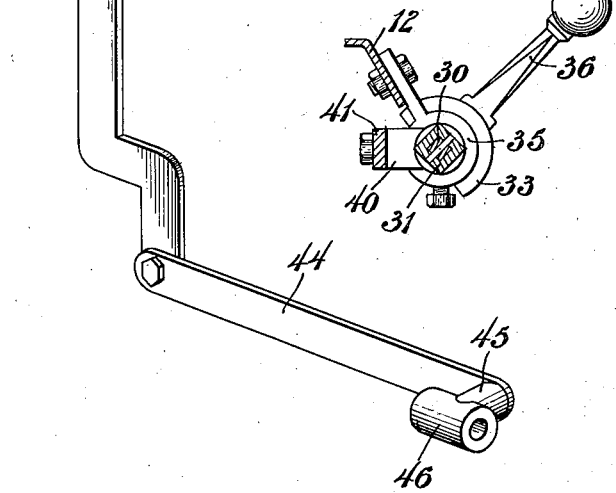
Fig.4.
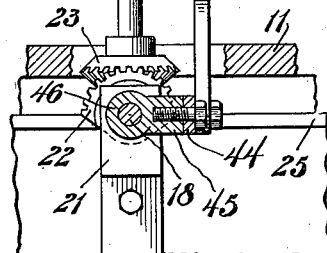
Elmer G. Kesling
INVENTOR
WITNESSES
C. L. McDonald
E. N. Lovewell
BY
E. G. Siggers
ATTORNEY Patented July 12, 1927.

1,635,483

UNITED STATES PATENT OFFICE.

ELMER G. KESLING, OF BLOOMFIELD, MISSOURI.

SPEED-CHANGING MECHANISM.

Application filed September 14, 1926. Serial No. 135,400.

This invention relates to speed changing mechanism for automobiles or other motor vehicles, and it is equally adaptable either to a gear shifting transmission mechanism, or to a transmission mechanism of the sliding key and all in mesh gear type.

The primary object of the invention is to clear the floor board of the automobile of the gear shifting lever by providing a speed changing mechanism with actuating means conveniently located within easy reach of the driver, and entirely out of the way of all the occupants of the automobile.

It is also an object of the invention to provide mechanism which is easy to operate and positive in its action, and which is simple and durable in its construction, so that it is not liable to get out of working order or adjustment.

A further object is to provide a mechanism in which the gears, or other devices, may be shifted to or from any operative or intermediate position by the manipulation of a single actuating element, without previously selecting or setting some parts of the mechanism.

A still further object is to provide a mechanism in which a shorter actuating lever is used, but the same leverage is obtained in shifting the gears as is the case when the common floor lever is employed.

According to the present invention, the desired selection and shifting are effected by the movement of a lever, which is located at some convenient point above the dash, and which is operatively connected to the gear shifting elements by novel and improved mechanism, extending downwardly adjacent one side of the automobile body. The specific construction of the mechanism by which these advantages are obtained will be more fully explained in the following detailed description, taken in connection with the accompanying drawings illustrating the same.

In the drawings:

Figure 1 is a sectional view of the invention taken transversely of the automobile body.

Figure 2 is a sectional view taken on the line 2—2 of Figure 1.

Figure 3 is a sectional view taken on the line 3—3 of Figure 2.

Figure 4 is a sectional view taken on the line 4—4 of Figure 1.

Figure 5 is a perspective view of the gear selecting mechanism.

Figure 6 is a perspective view of the box in which the actuating lever is mounted.

The invention is illustrated in connection with an automobile body 10, having a floor board 11 and a dash 12. Beneath the floor board 11 are shown two gear shifting yokes 13 and 14 of well-known type, which are mounted within a transmission housing having a cover 15.

In carrying out my invention, a shaft section 16 is mounted for longitudinal and rotative movement in a housing 17, located above the transmission cover 15. This shaft section is adapted to be shifted longitudinally, and then rocked in one direction or the other to shift either of the yokes 13, 14 in a manner to effect the desired shifts.

In order to effect the longitudinal and rocking movement of the shaft section 16, the outer end portion 18 of the latter is non-circular, and slidably received within a sleeve section 19, to which is secured an extension 20 journaled in a bracket 21 secured to the side of the body 10. A beveled gear segment 22 is secured to the section 20 of the extensible shaft, and meshes with a similar beveled gear segment 23 secured to the lower end of a vertical shaft 24, disposed adjacent the side of the automobile body 10. The lower end of the shaft 24 is journaled in the sill 25 of the automobile, and is held against endwise movement by a retaining collar 26 and a spacing collar 26ª, mounted between the bracket 25 and the gear segment 23.

The upper end of the shaft 24 is journaled in a bracket 27 secured to the automobile body. A beveled gear segment 28, secured to the upper end of the shaft 24, meshes with a similar gear segment 29 secured to a shaft section 30, which is journaled in the bracket 27, but held against endwise movement therein. A sleeve 31, similar to the sleeve 19 is secured to the shaft section 30, and slidably receives the non-circular portion of a shaft section 32, which extends into a box 33. This box is supported within easy reach of the driver by means of an integral neck 34, rigidly held in a bracket 35, which is secured to the dash 12.

The shaft section 32 is mounted for longitudinal or rocking movement in the neck 34, and is actuated by means of a hand lever 36, which is pivoted to the end of the shaft section, and extends through a slot 37 formed circumferentially in the box 33.

When the shaft section 32 is rocked by means of the lever 36, this motion is transmitted through the gear segments 29, 28, shaft 24, and gear segments 23, 22 to the shaft section 16, thereby shifting the yoke 13 or 14 longitudinally. For transmitting longitudinal movement of the shaft section 32 to the shaft section 16 a sleeve 38 is journaled on the shaft section 32 between two collars 39, which are secured to the shaft section. The sleeve 38 is formed with a boss 40 to which is pivotally connected one end of a link 41. The other end of this link is pivotally connected to the upper end of a lever 42, which is intermediately fulcrumed in a bracket 43 secured to the side of the automobile body. The lower end of the lever 42 is pivotally connected to one end of a link 44, the other end of which is pivotally connected to a boss 45 formed on a sleeve 46, which is mounted on the shaft section 16 between two collars 47, which are secured to the shaft sections.

From the foregoing description, it will be seen that rotative movement of the shaft section 32 will be transmitted to the shaft section 16 without in any way affecting the position of the lever 42, or the mechanism connected therewith, while the longitudinal movement of the shaft section 32 will be transmitted to the shaft section 16 without in any way affecting the position of the shaft 24. It will be seen that I have provided convenient and practical means, whereby the selection and shifting of transmission gears may be effected directly from the lever 36, which may be mounted above the instrument panel, or in any other position conveniently accessible to the driver, and the floor of the automobile body will be left entirely free from obstruction. The slot 37 permits the lever 36 to be moved to rock the shaft section 32, and is also widened at its edges sufficiently to permit the lever to be rocked on the same as a fulcrum when shifting the shaft section 32 longitudinally. The mechanism herein described for transmitting either endwise or rotative movement to the shaft section 16 is positive in its action, and free in its movement, and there is substantially no lost motion. The hand lever 36 may be as short as desired, while the connection between the shaft section 16 and the gear shifting yokes may be so made as to obtain any desired leverage in shifting the gears. The same H motion, and the same feel of the shift is had as with the customary shifting lever now in use.

While I have shown and described in detail the specific features of the invention in its present form, it is obvious that various modifications may be made in the structure and arrangement thereof without any material departure from the salient features of the invention as set forth in the claims.

What is claimed is:

1. A gear shifting mechanism comprising a housing adjacent the gears to be shifted, a longitudinally extensible shaft with one end mounted for longitudinal and rotative movement in said housing, a bearing in which the other end of said shaft is rotatable but not movable longitudinally, a second longitudinally extensible shaft similarly mounted, gearing connecting the shaft sections which are not movable longitudinally, and other means connecting the longitudinally movable shaft sections to cause the longitudinal movement of one to be controlled directly by the longitudinal movement of the other.

2. A gear shifting mechanism comprising two longitudinally extensible shafts, each having one section mounted for longitudinal and rotatable movement and another section mounted for rotatable movement only, gearing connecting the two sections which are rotatable only, other means connecting the longitudinally movable shaft sections to cause the longitudinal movement of one to be transmitted to the other, and manually actuated means for directly controlling both the longitudinal and rotatable movement of one of the last-mentioned sections.

3. A gear shifting mechanism comprising two longitudinally extensible shafts, each having one section mounted for longitudinal and rotatable movement and another section mounted for rotatable movement only, gearing connecting the two sections which are rotatable only, a sleeve journaled on each of the two longitudinally movable sections and held against lengthwise movement thereof, a lever having a fulcrum intermediate its ends, and links connecting opposite ends of said lever to the respective sleeves.

4. In a gear shifting mechanism, the combination of two shafts spaced from each other and extending in the same general direction, each shaft having a section which is selectively movable either longitudinally or rotatively, means for transmitting rotative movement of one shaft section to the other, and other means for transmitting longitudinal movement from one of said shaft sections to the other.

5. In a gear shifting mechanism, the combination of two shafts spaced from each other and extending in the same general direction, each shaft having a section which is selectively movable either longitudinally or rotatively, connecting means for transmitting rotative movement of one shaft section to the other, and other connecting means for transmitting longitudinal movement from one of said shaft sections to the other, either of said connecting means being selectively operable while the other is held stationary.

6. In a gear shifting mechanism, the combination of two shafts spaced from each other and extending in the same general direction, gearing connecting the two shafts for transmitting rotational movement from one to the other, each of said shafts having a longitudinal extensible section constrained to rotate therewith and having two collars secured thereto with a sleeve journaled therebetween, and means connecting the sleeve on one shaft to the sleeve on the other shaft for causing one of the extensible sections to move longitudinally when the other is moved longitudinally.

7. In a gear shifting mechanism, the combination of two shafts spaced from each other and extending in the same general direction, gearing connecting the two shafts for transmitting rotational movement from one to the other, each of said shafts having a longitudinally extensible section constrained to rotate therewith and having two collars secured thereto with a sleeve journaled therebetween, and means connected with the sleeve on one shaft and actuated by the longitudinal movement thereof to effect the longitudinal movement of the other sleeve and the shaft section on which it is journaled.

8. In a gear shifting mechanism, the combination of two shafts spaced from each other and extending in the same general direction, gearing connecting the two shafts for transmitting rotational movement from one to the other, each of said shafts having a longitudinally extensible section constrained to rotate therewith and having two collars secured thereto with a sleeve journaled therebetween, and means connected with the sleeve on one shaft and actuated by the longitudinal movement thereof to effect the longitudinal movement of the other sleeve and the shaft section on which it is journaled, said gearing and said means for transmitting longitudinal movement being each selectively operable independently of the other.

In testimony that I claim the foregoing as my own, I have hereto affixed my signature.

ELMER G. KESLING.